United States Patent [19]

Hess

[11] 4,040,380

[45] Aug. 9, 1977

[54] LOW PRESSURE TIRE WARNING DEVICE

[75] Inventor: Nelson Claire Hess, Cuyahoga Falls, Ohio

[73] Assignee: The B. F. Goodrich Company, Akron, Ohio

[21] Appl. No.: 773,454

[22] Filed: Mar. 2, 1977

[51] Int. Cl.² ............................................. B60C 23/04
[52] U.S. Cl. .................................. 116/34 R; 340/58; 200/61.25
[58] Field of Search ............ 340/58; 200/61.22, 61.24, 200/61.25; 116/34

[56] References Cited
U.S. PATENT DOCUMENTS

| 3,283,300 | 11/1966 | Hartmann | 340/58 |
| 3,462,734 | 8/1969 | Neu | 340/58 |
| 3,680,523 | 8/1972 | Gaskins | 116/34 R |

Primary Examiner—Alvin H. Waring
Attorney, Agent, or Firm—Joseph Januszkiewicz; W. A. Shira, Jr.

[57] ABSTRACT

A low pressure tire valve assembly having a standard tire valve core unit encapsulated at its lower end into a flexible rubber plug which has molded to it a distensible cylindrical member which biases a plurality of circumferentially spaced springs into latching engagement with an indicator cap. The indicator cap is ejected by spring means upon a loss of pressure due to collapse of the distensible member. Cord means interconnects the cap to the tire valve assembly.

10 Claims, 4 Drawing Figures

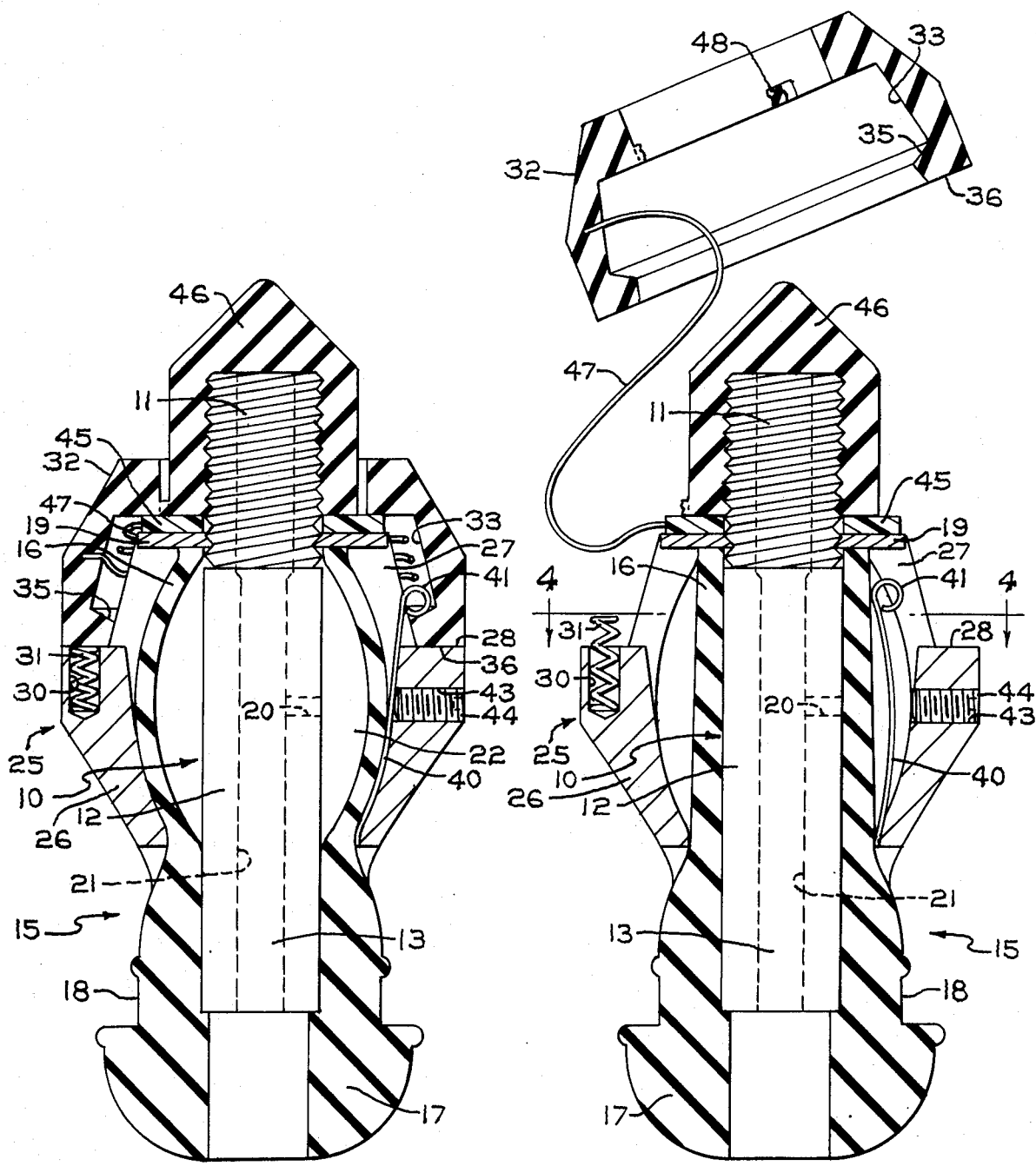

LOW PRESSURE TIRE WARNING DEVICE

SUMMARY OF THE INVENTION

The present invention contemplates a low pressure warning tire valve assembly; a conventional tire valve core units has its lower portion secured to a cylindrical plug for mounting in a conventional tire rim. The valve core is vented to a chamber formed by the valve core and upper portion of the cylindrical plug which in the operative position is distended. The distended upper portion engages a plurality of circumferentially spaced springs whose upper portion secure a cap member on the valve core. The cap member is secured to the tire valve assembly by a cord or chain member so that upon a loss of pressure in the tire, the distended upper portion of the cylindrical plug contracts and releases the springs so that the cap member is ejected by spring means to put it in a position to render an audible signal as the tire valve assembly rotates with the tire.

BRIEF DESCRIPTION OF THE DRAWINGS

FIG. 1 is an enlarged view, in vertical cross-section of the low pressure warning tire valve assembly in its normal operating conditions.

FIG. 2 is an enlarged view, in vertical cross-section of the tire valve assembly shown in FIG. 1 in the warning condition as where a tire is in a deflated condition.

DETAILED DESCRIPTION

Figure 3:
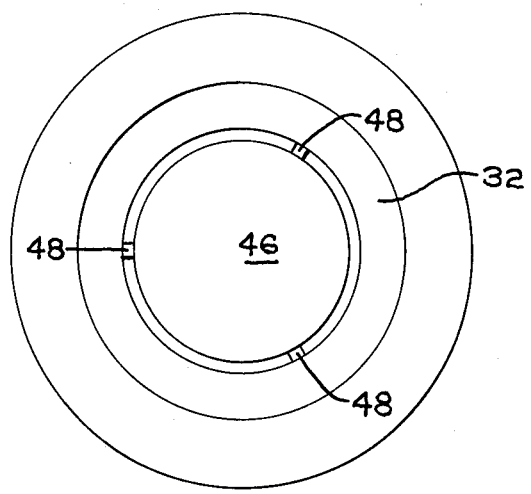
FIG. 3 is an enlarged plan view of the tire valve assembly showing the cap member attached to the valve cap.
Figure 4:
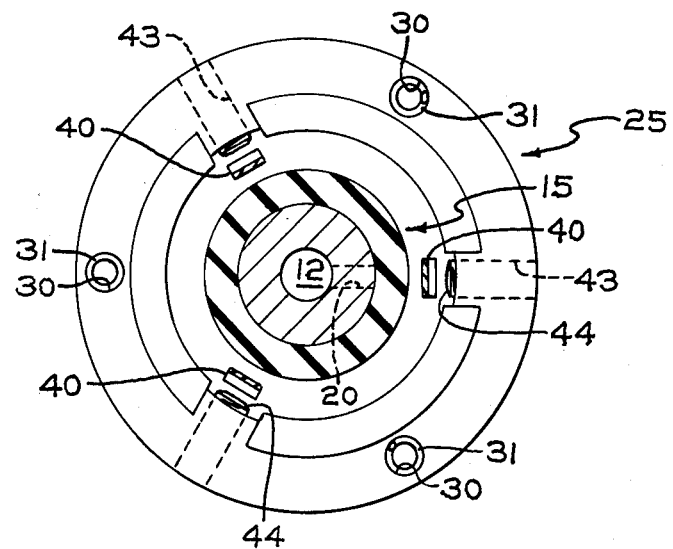
FIG. 4 is a horizontal cross-sectional view taken along the line 4—4 of FIG. 2.

There is shown in FIG. 1, a low pressure tire valve assembly composed of a conventional tire valve core unit 10, a cylindrical elastomeric member 15, an annular housing member 25 and a low pressure indicator cap 32. The standard or conventional tire valve core unit 10 has an upper threaded portion 11, an intermediate portion 11 and a lower portion 13. The cylindrical elastomeric member 15 has a flexible distensible upper portion 16 and a lower portion 17, which lower portion is suitably bonded to the lower portion 13 of the tire valve core unit 10 to form an integral unit. The lower portion 17 of the cylindrical member 15 is molded into the shape of a conventional rubber plug with an annular recess 18 to receive and sealingly engage a standard tire rim. The upper end portion of cylindrical member 15 is slightly compressed by a nut 19 threaded on the upper threaded portion 11 of valve core unit 10. A passageway or vent hole 20 in the intermediate portion of valve core unit 10 interconnects the central axial bore 21 of valve core unit 10 with the clearance space between the exterior wall surface of valve core unit 10 and the interior wall surface of the upper distensible flexible portion 16 of cylindrical member 15. Where such central axial bore 21 of valve core unit 10 is connected to the air chamber of a tire, the pressurized air will communicate with such clearance space and distend the upper flexible portion of cylindrical member 15 to form a chamber 22 (FIG. 1).

The annular housing member 25 encompasses the upper portion of cylindrical member 15. Housing member 25 as a lower frusto-conical portion 26 and an upper portion 27 of reduced diameter presenting a flanged intermediate portion 28 that is flat for a purpose to be described. The lower end of lower portion 26 abuttingly engages cylindrical member 15 while the uppermost end portion is engaged by nut 19, which retains the cylindrical member 15 and annular housing member 25 in position on valve core unit 10. Flanged portion 28 has a plurality of circumferentially spaced bores 30, which bores 30 receive compression springs 31. An annular shaped low pressure indicator cap 32 with a recess 33 on its inner periphery provides an annular lip or seat 35. The bottom annular surface 36 of indicator cap 32 abuttingly contacts the flanged portion 28 of annular housing member 25. The compression springs 31 exert a pressure on cap 32 to eject such cap from its position on the flange 28 in a manner to be described. A plurality of circumferentially spaced vertically disposed springs 40 acting as latch means have their lowermost end portion bonded to housing member 25. The springs 40 have a projecting portion 41 which are operative to engage and seat on the annular lip or seat 35 of indicator cap 32 when the flexible upper portion 16 is distended by air pressure as depicted by FIG. 1 such that the spring 40 is baised outwardly by the distended portion 16. Housing member 25 has a plurality of circumferentially spaced horizontally disposed threaded bores 43, which bores 43 receive a threaded screw 44. Screw 44 is used to adjust the tension on the respective springs 40.

A washer 45 is located over nut 19, and a threaded valve cap 46 is threaded onto the upper threaded portion 11 of tire valve core unit 10. An elongated chain or cord 47 having one end embedded in indicator cap 32 and the other end embedded in washer 45 interconnects the two to permit the outward movement of cap 32 a limited distance from the tire valve core unit 10. The indicator cap 25 as shown in FIG. 3 is interconnected to the valve cap 46 by a plurality of circumferentially spaced ribs 48 to provide a convenient means for assembling the tire valve assembly. After such assembling of the parts, indicator cap 25 is rotated a short distance to rupture the ribs 48 to condition the cap 25 for ejection from the tire valve assembly in a manner to be described. The ribs 48 may be deleted from the indicator cap 25 so that the parts may be assembled separately, thus there would not be any physical connected between indicator cap 25 and valve cap 46.

In the operation of the low pressure tire valve assembly, the assembly is installed on the tire rim in the conventional manner, such that annular recess 18 sealingly engages the standard tire rim. With valve cap 46 and indicator cap 25 removed from the valve assembly, air is introduced into a tire through the conventional tire valve core 10 in a manner old and well known in the art. During such inflation, pressurized air flow through the vent opening 20 to distend the upper flexible distensible portion 16 such that the circumferentially spaced springs 40 are biased outwardly. Indicator cap 32 separately or together with valve cap 46 are placed onto the valve assembly with cap 46 being threaded onto the upper threaded portion 11 of the tire valve core unit 10. Indicator cap 32, during such downward movement biases the projecting portions 41 inwardly until the annular surface 46 abuttingly engages the flanged portion 28 of the housing member 25, such that the projecting portions or abuttments 46 spring outwardly and engage the annular lip 35 to latch the indicator cap to the tire valve assembly. Under normal operating conditions no action will occur between the related parts, with valve cap 46 being removable to further inflate the tire through the valve core unit 10 or to check the tire's pressure in the conventional manner. Upon a loss in pressure in chamber 22, distensible upper portion 16 will collapse to the position shown in FIG. 2 and the springs 40 will release their gripping action on the indicator cap 32, such that the springs 31 will eject the indicator cap 32 outwardly away from the tire valve assembly as limited by the length of the cord 47. The length of the cord 47 is such that as the tire and tire valve assembly rotate, the indicator cap 32 strikes against the fender well with each revolution of the tire to provide the motorist with an intermittent audible warning of the unusually low tire pressure. The pressure at which the springs 40 release the indicator cap 32 may be adjusted by set screw 44.

It will be apparent that, although a specific embodiment and certain modifications of the invention have been described in detail, the invention is not limited to the specifically illustrated and described constructions since variations may be made without departing from the principles of the invention.

I claim:

1. A low pressure tire valve assembly comprising a tire valve core unit, a cylindrical elastomeric member encompassing said valve core unit and having its lower portion secured to said valve core unit, said valve core unit having a threaded upper portion and a bore extending therethrough for communicating with a tire chamber, said cylindrical member having a lower plug portion for reception by a tire rim and to sealingly engage such a tire rim, a housing member encompassing the upper portion of said cylindrical member, an indicator cap mounted on said housing member, latching means operative to interconnect said housing member and said indicator cap, vent means interconnecting said bore and the surface areas between the outer peripheral surface of said tire valve core unit and the inner peripheral surface of said cylindrical member operative to distend said cylindrical member to position said latching means into operative position, valve cup means on said tire valve core unit retaining said cylindrical member and said housing member positioned on said valve assembly, means interconnecting said indicator cap and said valve cap means for relatively a predetermined distance, and spring means mounted on said housing member biasing said indicator cap outwardly for ejection from said housing member.

2. A low pressure tire valve assembly as set forth in claim 1 wherein said valve cap means includes a flat washer abutting by engaging the uppermost end of said housing member, and said interconnecting means having core end embedded in said washer.

3. A low pressure tire valve assembly set forth in claim 2 wherein screw means are located in said housing member for adjusting the tension on said latching means.

4. A low pressure tire valve assembly as set forth in claim 2 wherein said latching means comprises a plurality of circumferentially spaced springs having one secured to said housing member and the other end operative to frictionally engage said indicator cap.

5. A low pressure tire valve assembly as set forth in claim 4 wherein said indicator cap has an annular recess on its inner periphery to provide a ledge portion for engagement by said other end of said spring.

6. A low pressure tire valve assembly as set forth in claim 5 wherein said other end of said spring has an outwardly extending end portion that is circular in configuration to provide a point contact between said spring and said ledge portion.

7. A low pressure tire valve assembly comprising a conventional tire valve core unit; said valve core unit having an upper threaded portion, an intermediate portion and a lower portion; a cylindrical elastomeric member having a lower portion, a distensible upper portion, and an outermost end portion; said lower portion of said cylindrical member encapsulating said lower portion of said valve core unit to be integral therewith; said lower portion of said cylindrical member being molded into a plug for securing said tire valve assembly to a tire rim; said valve core unit having a centrally disposed bore extending therethrough for communicating with the air chamber of a tire; a vent hole in said intermediate portion of said valve core unit communicating said bore with the space defined by the outer periphery of said intermediate portion of said valve core unit and the inner peripheral surface of said upper portion of said cylindrical member; a housing member mounted on said cylindrical member; an annular cap member mounted on said valve core unit; said cap member having a recess on its inner periphery surface; said recess defines an inner ledge portion; a plurality of circumferentially spaced springs secured to the lower inner portion of said housing member; each of said spring members having an upper abutment means operative to engage said inner ledge portion for retaining said cap member on said housing member; a nut threadedly engaging said upper threaded portion of said valve core unit to abuttingly engage the upper portions of said housing member and the outermost end portion of said cylindrical member; an annular washer mounted on said nut, a valve cap threaded onto said upper threaded portion of said valve core unit and abuttingly engaging said annular washer; cord means interconnecting said washer with said cap member; and biasing means mounted in said housing member for engagement with said cap member for biasing said cap member away from said housing member.

8. A low pressure tire valve assembly as set forth in claim 7 wherein screw means are located in said housing member for contacting said springs for adjusting the tension thereon.

9. A low pressure tire valve assembly as set forth in claim 8 wherein said abutment means on said spring members is a circular configuration to provide a point contact between said abutment members and said ledge portion.

10. A low pressure tire valve assembly as set forth in claim 9 wherein a plurality of shearable ribs interconnect said indicator cap and said valve cap.

* * * * *